United States Patent [19]
Pagnotta et al.

[11] 3,768,148
[45] Oct. 30, 1973

[54] METHOD OF JOINING PRINT CHARACTERS TO HIGH SPEED PRINTER FINGERS

[75] Inventors: Gasper Pagnotta; James Kiesler, both of Schenectady; William G. Moffatt, Hickory Hollow, Ballston Lake, all of N.Y.

[73] Assignee: General Electric Company, Schenectady, N.Y.

[22] Filed: Dec. 17, 1971

[21] Appl. No.: 209,277

[52] U.S. Cl. ............... 29/471.7, 29/480, 29/482, 29/497, 29/501
[51] Int. Cl. ............................................. B23k 31/02
[58] Field of Search ............... 29/501, 472.1, 471.7, 29/471.1, 482, 497, 480, 500

[56] References Cited
UNITED STATES PATENTS

| | | | |
|---|---|---|---|
| 1,155,426 | 10/1915 | Liebmann et al. | 29/501 X |
| 2,451,099 | 10/1948 | La Motte | 29/472.1 X |
| 3,300,854 | 1/1967 | Jackson et al. | 29/501 X |
| 3,526,954 | 9/1970 | Katz et al. | 29/501 X |
| 3,639,106 | 2/1972 | Yate | 29/471.7 X |

Primary Examiner—Richard B. Lazarus
Attorney—John F. Ahern et al.

[57] ABSTRACT

In the manufacture of high speed printer fingers having a character bar fixed to one end thereof, an improved method of joining the character bar to the printer fingers which includes forming spacer projections in the bar or finger blank prior to spot welding the parts together in order to provide a fixed gap between the finger blank and the character bar so that brazing alloy forms therein a uniform layer and flows in around the spot weld during the subsequent furnace brazing operation. The method results in a more uniform joint between the character bar and the type finger.

2 Claims, 8 Drawing Figures

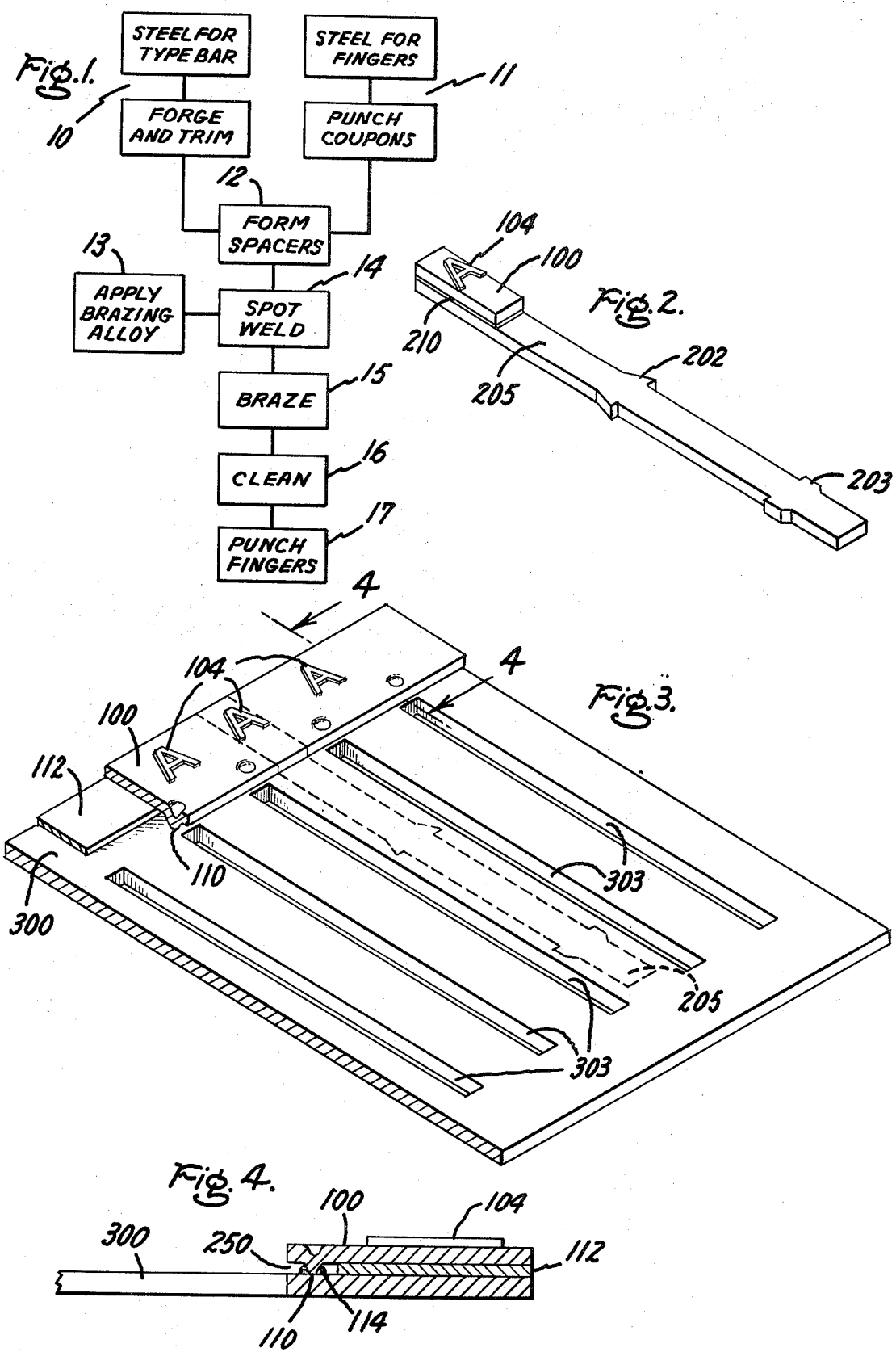

3,768,148

METHOD OF JOINING PRINT CHARACTERS TO HIGH SPEED PRINTER FINGERS

BACKGROUND OF THE INVENTION

This invention relates to a method for securing multi-element metallic parts to each other; more particularly, it relates to an improved method for producing type fingers having a raised type-face and secured at one end to an elongated member.

DESCRIPTION OF THE PRIOR ART

In the manufacture of type fingers for impact printing, the type fingers are carried by a flexible belt and are exposed to damage and wear due to the ballistic nature of the printing operation. Commonly the type fingers are made of metallic material and have a shank provided with shoulder portions adapted to fit within a slot on a carrier belt, and the raised type-face portion is a metallic bar joined to the end of the flexible shank portion or arm. In general, the joint between the type-face portion and the shank must be suitable to withstand repeated impact of the printing without premature failure. When the parts are spot welded together to hold them for brazing, shrinkage and distortion of the spot weld frequently results in faulty irregular joints because the brazing material does not have a fixed uniform space into which to flow when it melts and bonds the parts.

SUMMARY OF THE INVENTION

The present invention lies in an improved method for joining together two metallic components, one of which forms a print character bar and the other the flexible arm of high speed printer fingers.

One object of the present invention is to provide a method for producing superior type fingers capable of withstanding the repeated impact of the printing cycle without premature failure.

Another object of the present invention is to provide a method of producing a secure joint between two metallic members which is uniform in bond thickness and quantity over the major portion of the joint.

In accordance with a preferred embodiment of the invention, there is provided a plurality of spacer projections in one of the two members being joined to space the member a fixed distance from the other member. Brazing alloy sheet, having a thickness about the height of the projections, is then interposed between the two members as a layer sandwiched therebetween. The sheet is perforated or slotted with apertures to fit around the projections and provides a fixed quantity of brazing alloy. Spot tack welding then joins the other of the members to the tips of the projections, thus defining a gap in which the sheet of brazing alloy remains sandwiched between the two members and in the space surrounding the projections. The subsequent furnace brazing operation then melts the brazing alloy sheet, which flows into the space around the spot weld to form the permanent joint. The tack spot welds, located between the type fingers, may be discarded during the subsequent punching-out operation, leaving only the braze as a uniform bonding layer between the two joined parts.

According to another embodiment of the invention, after the projections are formed and the tips thereof tack spot welded to the other member, the braze alloy may be applied in paste form along the spaced-apart faying surfaces of the type bar and arm-forming coupon which are held spaced apart by the projections. The character bar is thus temporarily spot welded to the arm-forming coupon blank to hold it in fixed position during the furnace brazing operation, or other method by which the braze, in liquid form, flows into the space between the opposed surfaces. The type fingers are later punched out of the assembled elements in such a way as to provide a single character disposed at one end of each arm or finger. The tack spot weld which holds the parts together during the brazing operation is not part of the final assembly, but becomes part of the discarded portion of the coupon blank.

The manner in which the above objects are achieved and other features of the invention will be more clearly understood and appreciated from the following detailed description, taken in conjunction with the accompanying drawing.

BRIEF DESCRIPTION OF THE DRAWING

FIG. 1 is a flow chart showing pertinent steps in connection with carrying out the principle steps of the method of this invention in accordance with preferred detailed embodiments;

FIG. 2 is a typical type finger produced in accordance with the invention;

FIG. 3 is an isometric cut-away view illustrating the steps in the assembly of one form of the invention;

FIG. 4 is an enlarged section taken in the direction of arrows 4—4 of FIG. 3;

FIG. 1 is a modification of the method shown in FIGS. 5 and 6; and

Figure 5:
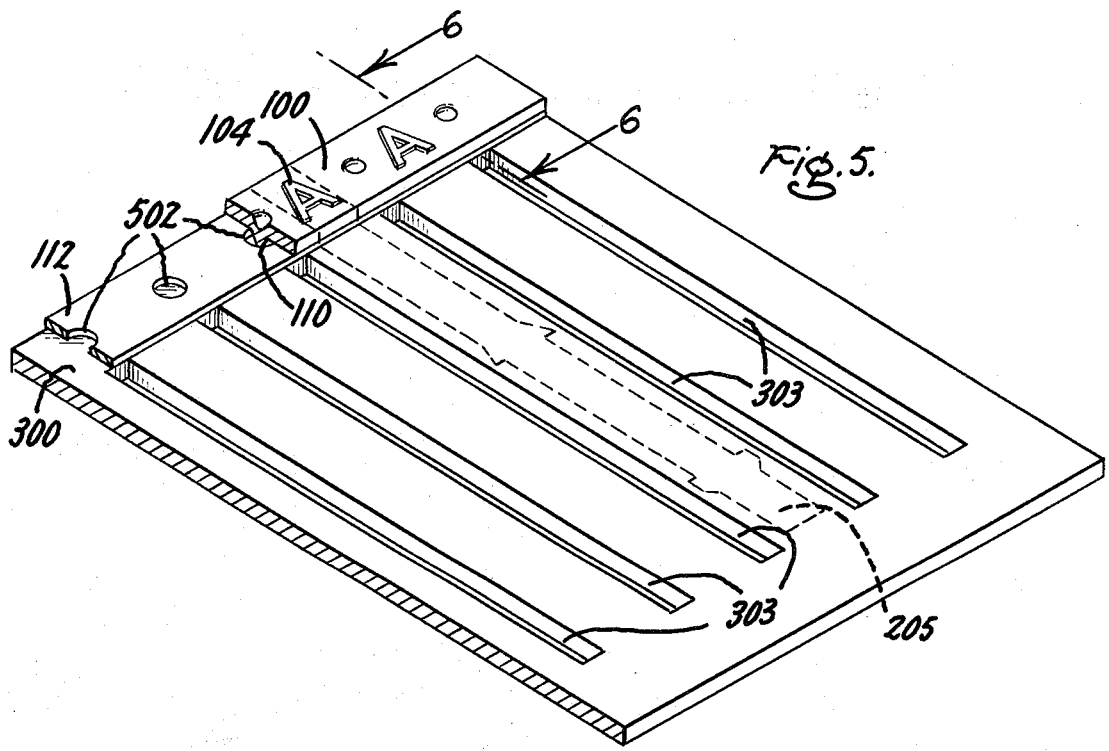
FIG. 5 is an isometric cut-away of a modification of the method of FIG. 3.

The flow chart of FIG. 1 indicates that the first steps 10 and 11 comprise selection and forming of the steel for the type bar member 100 and for the fingers 200 which form the assembly from which the type fingers 200 according to FIG. 2 will eventually be punched. The character bar 100 which forms the type face and the type fingers blank 300 which forms the fingers are forged and punched, respectively, to form the respective parts of the assembly of FIGS. 3 and 5. Spacer projections or dimples 110 are then formed in either the character bar member 100 or the coupon blank member 300 to space them apart from each other. The tips of these projections 110 are tack spot welded to the other member to define a gap or space 250 between the opposed faces of the two members. A quantity of brazing alloy 112 is then applied between the members to fill the gap 250, or the braze material may be applied as a paste along the edges of the spaced-apart type bar 100 and finger blank 200, to flow into the gap during the furnace brazing operation.

The type bar 100 of the assembly contains a plurality of print characters 104, which may be different or may be all the same. In addition locating pins (not shown) may be provided to precisely locate the bar laterally. Each of the characters 104 on the bar 100 is precisely spaced at intervals with distances between the center lines thereof. The formed projections 110 which are spot welded at their tips are placed between the print characters 104.

The projections 110 define the gap or space 250 which becomes filled with brazing material 112 in accordance with the present invention and its various embodiments.

FIG. 2 illustrates a typical type finger 200 according to the present invention after it has been punched out from the assembly shown in FIG. 3 or 5. This type finger includes a raised character bar portion 104 adapted for printing the letter "A," for example. The character bar portion 104 is fastened by a joint 210 to a shank portion 205 having upper and lower shoulder portions 202, 203. The making of the joint 210 which fills the interspace 250 will be described below in connection with the various embodiments shown in FIGS. 3-8. The same numerals designate the same or functionally similar parts throughout the several figures.

As shown in dotted lines in FIGS. 3 and 5, the member 205 of FIG. 2 is formed by punching out from the coupon blank 300, which is provided with a number of elongated slots 303 employed to control warping during the subsequent brazing cycle. These coupon blanks 300 and the arms 205 punched therefrom are preferably formed of a spring steel having relatively good hardness and favorable fatigue limits, with good spring properties.

The sapcer projections or dimples, identified as 110 or 110a, may be formed in either the bar 100 (FIGS. 4, 6 and 8) or in the coupon blank 200 (see 110a in FIG. 7), preferably in the latter. These spacer projections 110, 110a define a gap 250 of fixed distance between the members 100 and 300. The brazing alloy material 112 or 212 has a thickness about the height of the projection 110, or 110a and, as illustrated in FIGS. 3 and 4, is positioned in the gap 250 between the coupon blank 300 and the character bar 100. Spot welds 114 then tack the tips of the projections 110 to the opposing member, which in the case of FIG. 3 and 4 is the coupon blank 300.

Figure 6:
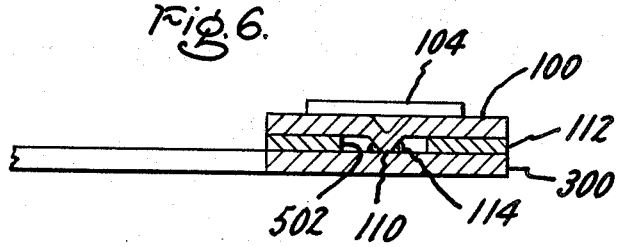
FIG. 6 is a cross-section taken in the direction of arrows 6—6 of FIG. 5.
Figure 7:
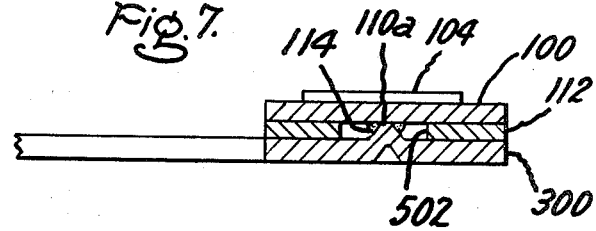

In the embodiment of FIG. 5 and 6, precisely located holes or apertures 502 formed in the brazing alloy foil 112 surround the formed projections 110 for easy insertion of the brazing alloy. The character bar 100 in the embodiment of FIG. 5 is then positioned laterally by locator pins and holes (not shown) and spot tack welded at 114 (FIG. 6). The spot welds at the projections 110 are located laterally in the area between the characters 104 on the character bar, and away from the portion which will subsequently form the type face 104 of the fingers or the shank portion 205 aligned therewith. Thus, the tack spot welds 114 and projections 110, 110a form a temporary rigid assembly, which now serves as its own fixture to maintain dimensional accuracy of the assembly through the brazing and handling operations. However the spot welds 114 and projections 110, 110a are cut away during the subsequent punching-out operation. By spacing the members 100 and 300 vertically apart to form the gap 250 and then inserting the brazing materail 112, more uniform and consistent welds and brazed joints can be produced in this manner.

Figure 8:
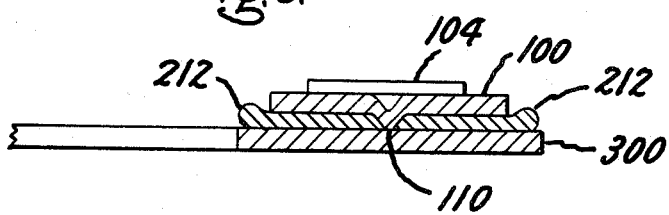
FIG. 8 is another modification of the method according to the invention.

In the embodiment of FIG. 8, the brazing material 212 is applied as a paste between and in contact with the opposed faces of the members 100, 300 so that as it melts the brazing material 212 can flow in and around the projections 110 to form a uniform layer of brazing material in the gap between the opposed members.

The assembled elements of FIGS. 3 and 5 are placed into a brazing furnace in a known manner while held by the tack spot welds 114.

The selection of the brazing alloy 112 or 212 is in accordance with that well known in the art and depends upon the requirements of capillarity, strength, thermal limitations of the base metals, furnace contamination limitations, ease of application, uniformity of results, and ease of removal of flux and binder residuals.

The brazing alloy 112 in the embodiments of FIGS. 3, 4, 5, 6 and 7 is applied as a sheet of foil, sandwiched between the two members to be joined together. Alternatively, as shown in FIG. 8, the brazing material 212 is applied as a liquid or paste into the joint. The entire assembly is then inserted into an appropriate furnace for heating to melt the braze alloy material, which expands and flows into the joint 250, thus securing the parts together. The alloy, when melted, flows between the adjoining surfaces of the bar and coupon, uniting the interfaces. The thickness of the foil or other braze material 112, 212, is essentially equal to the height of the projections 110, so that the gap 250 between the opposed interfaces is a fixed distance apart, thus resulting in a consistently uniform amount of brazing material to fill the joint. The brazed assembly, with the uniformly thick brazed joint between and joining the members 100, 200, may then be positioned in a punch and die, and the individual fingers of FIG. 2 punched out and then subjected to cleaning, hardening, deburring and plating, as required.

Reviewing the method of this invention, it will be appreciated that the described method makes possible a reliable bonding of preforged parts to a flat spring material while avoiding distortion of the dimensional or mechanical properties of either part. Further, it provides for the maintenance of very precise dimensions of the finished units.

It will be understood by those skilled in the art that equivalents or modifications of, or substitutions for, part of the specifically described embodiments of the invention may be made without departing from the scope or spirit of the invention as set forth in what is claimed.

We claim:

1. The method of producing a plurality of high speed printer fingers each comprising a flexible metal arm member and a character member fixed to an end of the arm member, which comprises the steps of forming a character bar of metal having a plurality of character members disposed along the length and on the upper side thereof and having a plurality of projections extending a uniform distance from the lower side thereof at intervals along the length of the character bar between the character members, providing a coupon blank of flat spring metal, bringing the character bar adjacent to one end of the coupon blank with the said projections bearing against the top surface of the said blank, spot tack welding the said projections to the coupon blank to fix the character bar in position relative to the blank and provide a gap of uniform width between said bar and coupon blank, heating the resulting assembly and substantially filling the gap between the character bar and blank with molten brazing material, cooling the assembly and freezing the brazing material in contact with opposed surfaces of the character bar and coupon blank to unite these parts in an integral structure, then punching out and removing a plurality of separate printer fingers from the structure between the character bar projections.

2. The method of claim 1 in which the coupon blank is of spring steel, and in which as an intermediate step a brazing alloy foil is placed on the coupon blank before the projections of the character bar are brought into contact with the blank so that when the projections are spot tack welded to the blank the brazing alloy foil is disposed between the said bar and the blank and in contact with the opposed surfaces of said bar and blank.

* * * * *